3,070,995
VIBRATION ANALYZING SYSTEM
Alan Broder, Glen Oaks, and Henry H. Wakeland, New York, N.Y., assignors to Sperry Rand Corporation, a corporation of Delaware
Filed Aug. 11, 1958, Ser. No. 754,342
8 Claims. (Cl. 73—67)

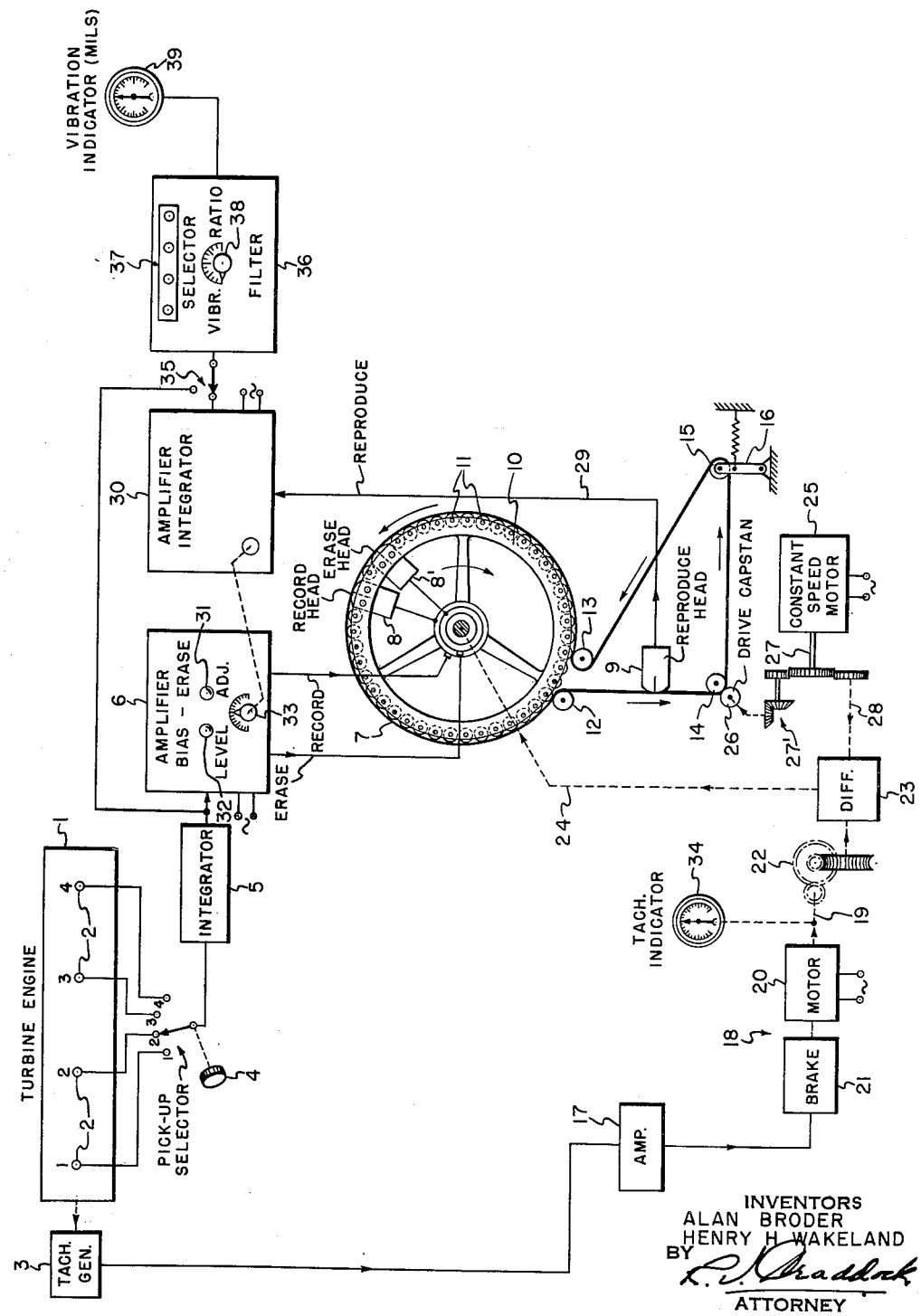

The present invention relates to apparatus for analyzing the operation of machinery and, more particularly, to an analyzer for turbine-type engines by which the operation of the engine may be examined through an analysis of the vibration characteristics thereof. The examination is carried out through frequency analysis techniques, employing measures of the frequencies of vibration set up by the rotating engine and its components.

Heretofore, a vibration analysis of engines such as turbo jet and turbo prop engines has been found difficult since such analysis has required numerous calculations by the operator in his attempt not only to identify the source of the vibration but also to identify vibrations during changing speeds of the engine. In most cases, analysis has been by operating the engine at some constant speed rather than an analysis thereof over a speed range of the engine. Furthermore, such previous vibration analysis apparatus have been large and expensive, clumsy in the operation of their controls, and generally inefficient.

It is therefore a primary object of the present invention to provide a vibration analyzer apparatus for rotary engines which provides accurate vibration analysis of the sources of vibration in the engine over a speed range thereof, which requires no calculations on the part of the operator, the vibration characteristics being substantially instantaneously indicated and which, at the same time, is very simple to operate, requiring no extended operator training period.

In an engine such as a turbo jet or a turbo prop aircraft engine, poor or abnormal operation of the engine is evidenced at least in part by the vibration characteristics of both the major and minor rotating engine parts or components and it is desired, under such abnormal operating conditions, to be able to identify those parts which are not operating normally and which are therefore contributing to such abnormal operation. For example, should some of the blades of the compressor become defective so as to produce an unbalanced condition of the engine rotor, the vibrations produced thereby would constitute an abnormal operation of the engine; the same being true in the case of the main rotor bearings, fuel pump, alternators, prop reduction gearing, and so forth. All of these and other components are subject to unbalance or other failure conditions which cause abnormal vibrations which will contribute to the overall abnormal operating conditions of the engine. Also, both the normal and abnormal vibration characteristics of the engine change with engine speed and therefore, it is desired to analyze the vibration characteristics of the engine over substantially its entire speed range.

It is therefore a further object of the present invention to provide apparatus by which the vibration characteristics of individual components of the engine may be selectively analyzed not only at normal operating speeds but also at any desired speed thereof over its operating speed range.

The rotating parts of turbine engines are usually connected with gears and operate at relative speeds which are fixed by the gear ratios between the parts. The speed of the engine is measured by a tachometer generator which may be driven by one of the parts of the engine and therefore its output signal will have a frequency that is proportional to the actual speed of the part to which it is attached. Since the gear ratios between the engine rotor or rotors and the particular part to which the tachometer is attached are fixed and since all other rotating parts of the engine are connected with the engine rotor or rotors through fixed gear ratios, the frequency of the tachometer output is proportional to the speeds of all rotating parts of the machine. In other words, there are fixed ratios between the frequency of the various engine rotating parts and the frequency of the tachometer generator signal. This ratio is therefore termed the "tachometer ratio."

Of course, the tachometer ratio for any given machine part is fixed for that particular machine. Therefore, by sensing the tachometer speed and knowing the tachometer speed and knowing the tachometer ratio for any given part, the frequency of that part may be established and followed automatically by the frequency normalizing apparatus described hereinbelow. Thus, the tachometer ratios for the various parts of a specific type of engine may be recorded together with their normal vibration frequencies over the speed range of the engine and used as a reference for analyzing the operation of other engines of the same type.

The vibration analyzing system of the present invention utilizes a method and apparatus by which the frequency and intensity of vibrations are detected by vibration pickups attached at appropriate locations on the engine. The signal outputs of the vibration pickups which contain the vibration frequencies of all engine rotating components for all engine speeds over the speed range of the engine are normalized to some predetermined standard speed reference. By this normalizing apparatus, the vibration frequency spectrum of the engine and its components at any speed of operation over its speed range is continually converted to a reference frequency spectrum so that component frequencies contained therein may be individually examined at any engine speed through the use of fixed filter networks or filter networks tunable only over the reference frequency spectrum. These filters may be calibrated in terms of the tachometer ratios which, as stated, remain fixed over the entire speed range. The amplitudes of the frequencies passed by the filters therefore indicate the vibration characteristics of the selected part and whether or not they exceed established normal amplitudes for that particular engine speed at which the reading is taken.

It is therefore a further object of the present invention to provide a method and apparatus for analyzing an engine wherein the frequencies of vibration of various engine parts bear known fixed ratios to engine speed over the speed range of the engine, comprising measuring the actual frequencies and amplitudes of engine vibrations occurring at the existing rotational speed thereof, transforming such measured vibration frequencies to frequencies corresponding to some reference speed, selectively filtering said transformed frequencies in accordance with said known ratios, and then measuring the amplitude of the filtered frequencies.

One example of a means for accomplishing the normalizing effect described above comprises a recording and reproducing means or apparatus and a mechanism which produces relative motion between the recording and reproducing devices and the recording medium, said variable motion being a function of the actual operating speed of the engine and some reference speed. For example, the recording medium might be a magnetic tape and the magnetic recording head is given a variable velocity relative to the recording tape in accordance with the actual engine speed, while the tape moves at a constant or reference velocity, relative to a stationary magnetic reproducing head. By this means, the variable speed of operation of the engine is effectively reduced or increased to the reference speed as far as the output signal from the reproducing head is concerned. This frequency transformation is accomplished by the above apparatus without altering or changing the intensity or amplitude of the detected vibration frequency. Thus, the vibrational characteristic of each part of the mechanism may be read out immediately for all engine speeds and can be selectively separated from the over-all or resultant frequency characteristic or frequency spectrum of the engine by means of frequency sensitive filter devices such as a band-pass filter tuned by setting the part selector knob to the part's characteristic frequency. In other words, by selectively choosing the band-pass frequency of the filter corresponding to a known vibration frequency of a particular engine part, it may be determined whether or not this part is vibrating normally by means of a meter indicating the amplitude of the vibration frequency passing through the filter, regardless of engine speed or changes of engine speed. Thus, the band-pass filter may constitute a dial suitably labeled with part names and/or with numbers which identify the vibration ratio for the selected source or sources of vibration while the amplitude of vibration of this source may be read on the meter.

The foregoing means of vibration source identification and amplitude measurement continues to be effective during changes in speed of the engine and over a wide speed range. In testing an engine, it is desirable to make a continuous traverse of the engine speed range and to note the speeds at which vibration of certain sources is most prominent or minimized and to draw conclusions therefrom as to the operating condition of the sources. Thus, rapid changes in engine speed do not produce any quantitative or magnitude errors in the vibration indication and engine speed can thus be changed as rapidly as readings can be practically observed.

Other objects and advantages of the present invention will become apparent as the description of a preferred embodiment proceeds, reference being made to the accompanying drawing wherein FIG. 1 is a schematic diagram of a turbine engine analyzer embodying the teachings of the present invention.

In the use of the engine analyzer of the present invention there is included, as a preliminary part of this use, a vibration frequency analysis of preferably a number of normally operating engines so that normal vibration amplitude limits may be established. This initial frequency analysis may be prepared by calculation as well as by experimental use of the present analyzer, which analysis comprises the establishment of amplitude limits for all vibrating engine parts that it is desired to examine.

As stated, it is desired to examine the operation of the engine not only when the engine is operating at a fixed speed but also at any engine speed over its entire range of speeds as well as during accelerations and decelerations of the engine. Since each engine component will contribute a predetermined vibration frequency to the vibration frequency spectrum of the engine as a whole and since each of these frequencies may be expressed by a particular tachometer ratio, a band-pass filter calibrated in tachometer ratios and selectively tunable over a range of frequencies including these component frequencies, or a plurality of fixed band-pass filters each tuned to its respective component frequency and calibrated accordingly, may be used to enable the operator to "look at" the vibration of each component through a meter or other indicator coupled with the output of the filter and hence responsive to the frequency passed thereby. Therefore, in order to allow the frequency scale or tachometer ratio calibration of the filter to remain constant for all engine speeds, the entire frequency spectrum of the detected vibration at all engine speeds is reduced or transformed or normalized to that range of frequencies covered by the filter network. In effect, the band-pass filter calibrated in accordance with tachometer ratios becomes an engine component selector controllable by the operator at any engine speed to display to him the vibration performance of the various components of the engine under examination.

Referring now to the drawing, reference character 1 designates a rotary mechanism or engine which, for example, may be a turbine engine for aircraft such as a turboprop or a turbojet engine. A plurality of vibration pickups 2 are mounted at appropriate locations on the engine so that the vibrations characteristic of the engine that are most pronounced at or near these engine stations may be analyzed. The vibration pickups may be of any type which produce an electrical signal output having essentially the same wave form, both as to frequency and intensity, as the physical vibration. These pickups may be of the piezo-electric type or they may be of the magnetostriction type such as disclosed in U.S. Patent No. 2,534,276, issued to Joseph H. Lancor, Jr., on December 19, 1950, or may be of the now-familiar velocity pickup type. Also mounted on the engine and driven thereby is a tachometer generator 3 for producing a preferably alternating electrical signal having a frequency proportional to the speed of operation of the engine, and, as stated above, since the gear ratios between the generator and the various engine parts are fixed, each engine part may be identified by its tachometer ratio. Also since the vibration frequency of the engine parts is generally proportional to their speed of rotation, their vibration frequencies are proportional to the part's tachometer ratio. A suitable vibration pickup selector switch 4 is provided for selecting the pickup located at or near that part of the engine, the vibration characteristics of which it is desired to examine. It will be appreciated that each vibration pickup produces a signal proportional to the total, composite, or resultant vibration frequency of the engine as a whole at the particular selected speed at which it is running, that is, it produces a signal containing the vibration frequency spectrum of the engine for that speed and at the selected engine locale.

In an embodiment wherein a velocity type pickup is employed, the signal output thereof will be proportional to the rate of change of the vibration amplitude so that in order to provide a signal, the amplitude of which represents or is dependent upon the amplitude of the physical vibration, the signal is passed through a suitable form of electrical integrating network 5, the output signal amplitude and frequency of which is dependent on or has a wave form the same as the actual vibration detected by the pickup. This signal is impressed upon the input of a first amplifier 6 where it is amplified to a desired level. The equipment so far described constitutes apparatus for detecting and obtaining a measure of the actual frequency and amplitude of an engine vibration at the actual or instantaneous rotational speed of the engine.

The next apparatus used in the practice of the present invention is that which functions to transform the frequencies of the actual vibration of the engine to a frequency range corresponding to some reference speed. In the illustrated embodiment, the apparatus provided for doing this constitutes a means for processing the vibration signal so that its amplitude will remain constant while the frequencies of the spectrum are multiplied by a factor equal to the reference speed divided by actual engine speed.

In the present embodiment, the means for accomplishing this transformation comprises a recording and reproducing apparatus which includes an endless loop of magnetic tape 7 upon which the output wave form of amplifier 6 is recorded as by means of a magnetic recording or write head 8, the data thus recorded being reproduced by means of a reproducing or read head 9. The recording-reproducing mechanism is so constructed and arranged that variable relative motion between the recording or reproducing means and the tape is produced, this relative motion being governed by engine speed. For this purpose, the tape 7 is supported by a rotatable wheel 10 and a plurality of rollers 11, and pulleys 12, 13, 14 and 15 and is driven at a constant speed (so many inches per second). The reproduce head 9 is fixedly supported so that the tape is driven past the same at that constant speed. However, the record head 8 is driven relative to the constant speed tape 7 at a speed which varies in timed relation with the instantaneous or actual speed of rotation of the engine. This is accomplished by mounting the record head 8 on the rotating wheel or member 10 which in turn supports the plurality of rollers 11 circumferentially arranged about the periphery of the wheel 10 and around which the tap 7 is reeved. This structure enables the recording head 8 and the tape 7 to be driven at variable relative speeds. Tape 7 is further supported by means of exit roller 12, entrance roller 13, roller 14, and tensioning roller 15, the latter being mounted on a suitable spring-loaded lever 16 for maintaining the tape at a uniform tension. From the foregoing, it is clear that the frequency transforming mechanism so far described provides the means by which the detected vibration frequencies may be recorded on a recording medium with one wave length, while, at the same time, these vibrations, a moment later, may be reproduced with a different apparent wave length, and thus a different frequency.

As outlined above, the detected vibration frequency is recorded on the tape at a speed dependent upon the actual engine speed and is reproduced at a constant speed. In order to drive the record-head-supporting wheel 10 at a speed dependent upon the speed of the engine, the output of the engine tachometer 3 is applied, after suitable amplification in amplifier 17, to a variable speed motive means 18, which serves to provide a mechanical output or rotation of shaft 19 precisely in accordance with the actual speed of the engine. While any means which will perform this function may be employed, such as a speed follow-up servo system, the illustrative embodiment employs a variable speed motive means which comprises an electric motor 20, the speed of which is accurately controlled by means of a suitable electromechanical brake 21, the braking characteristic of which is controlled in accordance with the speed signal from tachometer generator 3. For example, the brake 21 may be an electromagnetic clutch of the powdered iron type developed by the Bureau of Standards and well-known to those skilled in this and allied fields. This form of variable speed drive is desirous because it provides substantially instantaneous response to changing speeds of the engine. The output shaft 19 of motor 20 is applied through suitable reduction gearing 22 to one input of differential 23, the output of which is mechanically connected, as indicated by a dotted line 24, to rotate wheel 10 supporting the record or "write" head 8 whereby the wheel 10 and hence the record head 8 are driven in timed relation with the actual speed of rotation of the engine.

The tape 7 is driven by a motor 25 at a constant speed and is also drivably coupled to the tape drive capstan 26 through suitable speed reduction gear 27. A further output 28 of the constant speed motor 25 is applied as the second input to the differential 23 so that the output speed of the latter varies in accordance with the difference between the constant speed of motor 25 and the variable speed of motor 20. This mathematical difference factor is the needed input to the record wheel 10 to produce the required inverse relation between the transformed frequency of the actual vibration signal and the engine speed or frequency.

The output of the reproducing head appearing on lead 29 is applied to the input of a second amplifier 30 which includes an integrating means for compensating for the effects of electrical differentiation produced by the reproducing head as is usual in magnetic tape readout circuits. The output of the second amplifier 30 appearing on lead 35 is therefore a signal containing the vibration frequency spectrum of the engine vibration detected at the selected vibration pickup, which frequency spectrum has been normalized or transformed as a whole to the frequency spectrum it would have at the reference speed.

The first amplifier 6 not only serves to amplify the detected vibration signal to a desired recording amplitude but also provides a recording bias voltage to the signal supplied to the recording head 8 as is common practice in magnetic type recorders. Also, since the record head may perform cyclic movements with respect to the tape, previously recorded information must be removed or erased prior to the next recording cycle. For this puspose, the recording device includes an erase head 8' positioned as closely as possible to the record head 8 but preceding it with respect to the direction of relative motion of the wheel 10 and the tape 7. The erase current is also supplied by the amplifier 6 and may constitute a high frequency A.-C. voltage.

While it is realized that there might be a small length of tape leaving the wheel 10 without any information recorded on it, due to the movement of the erase head past the exit roller 12 before the record head 8 passes the exit roller, this unrecorded-upon tape distance may be made extremely small by proper design so that its effect on the performance of the system will be very small and even negligible. There may be sharp discontinuities in the output voltage supplied by the reproduce head but these also may be rendered unnoticeable by proper choice of mechanical design. For example, the unwritten on space or discontinuities may be made very, very small by rotating the record-erase head at a fairly rapid rate, even at the lowest engine speed expected. For example, a tape speed of 2½" per second relative to the record-erase head at the lowest expected engine speed and a record-erase head spacing of .7" has been found to render the above effects negligible.

As in most tape recorders, it is desired to monitor the level of the recording signal since the best operation of the recording and reproducing process occurs when the tape is operated at a level not so high as to cause saturation of the tape, and therefore distortion of the recorded signal, and yet not so low as to be lost in, or distorted by, noise. Thus, amplifier 6 is provided with two neon bulbs or other indicating means 31, 32 for providing an indication of the level of the record signal. For example, one light 31 may go on to indicate that the signal is at or near the desired recording level while both lights 31 and 32 may go on to indicate that the signal is at too high a recording level. When both lights are illuminated, a recording level adjustment 33 may be operated to attenuate the incoming signal from the pickups to thereby reduce the same to the desired level. However, in accordance with the teachings of the present invention, the amplitude of the vibration signal is the critical engine characteristic to be examined. Therefore, adjustment of the level adjustment 33 to attenuate the incoming signal may, without some means of compensation, also attenuate the output, thus giving an incorrect amplitude measure or indication. Therefore, a reciprocal adjustment may be provided in second amplifier 30 which is operated simultaneously with the level adjustment 33. In other words, if the recording level is reduced in the amplifier 6 for recording purposes, it is simultaneously raised the same degree in amplifier 30 thereby maintaining the output amplitude of the second amplifier unaffected by the recording level adjustment 33. A convenience of this level adjustment lies in the fact that the over-all range of vibration amplitudes which can be accepted by the analyzer may be greatly extended. Furthermore, the recording level adjustment may adapt the system to other types of recording mediums which may be employed in carrying out the teachings of the present invention. As a further convenience, the system is provided with a tachometer indicator 34 driven by the output shaft 19 of the variable speed motor 20. This indicator may provide an indication of engine speed in terms of r.p.m., percent r.p.m., and/or in terms of tachometer or engine frequency.

While the frequency transforming or normalizing apparatus has been illustrated as involving a magnetic tape recorder driven as above described, it is to be understood that other types of recorders may be used and indeed completely different sorts of frequency transforming apparatus may be employed without departing from the true scope and spirit of the teachings of the present invention.

The total or resultant vibration frequency spectrum which has been detected by the pickup and transformed or normalized as a whole by the recording apparatus described above is applied as an input to a filter device generally indicated at 36 in the drawing. Since the vibration frequency spectrum contained in the output signal from amplifier 30 is normalized by the apparatus just described, the filter need only be capable of passing the normalized frequencies thereby minimizing the number of fixed filters or the frequency range over which a variable filter need be effective. It is the function of the filter to make it possible for the operator to select from this normalized frequency spectrum only those component frequencies produced by the particular engine component that he desires to examine. For convenience of operation, the illustrated embodiment provides a plurality of push buttons 37 which may serve selectively to tune filter 36, or selectively to switch into circuit those circuit components required to form a filter so tuned, to pass only that frequency corresponding to frequency of that component at the standard speed. Each filter selection push button may be numbered or otherwise marked in terms of the tachometer ratio of that engine component whose vibration is allowed to pass the filter. If desired, the entire normalized frequency spectrum of the engine vibration may be examined in a continuous manner by means of a vibration ratio selector knob 38. This provides a means for scanning the entire vibration frequency spectrum produced by the engine pickups.

In order to determine whether or not the magnitude of the vibration of various selected engine components is normal or abnormal for the speed at which the engine is running, the selected frequency passed by the filter 36 is applied to a vibration amplitude indicator 39, the deflection of which indicates the magnitude of the vibration of the component selected. This indicator or meter may be calibrated to indicate vibration displacement of the selected part in mils.

A switch 35 enables the normalizing components to be bypassed, applying the output of integrator 5 directly to the filter 36. This arrangement may be used in operating the equipment when a speed-sensing means cannot be attached to the engine. The filter then functions as the well known and conventional wave analyzer and the scale associated with knob 38 may be changed so as to read in frequency rather than in tachometer ratios. Under this type of analysis, the engine is run at a fixed speed.

The operation of the apparatus of the present invention may be more clearly understood by first considering a condition wherein the engine is operating at a speed corresponding to the reference speed. After selection of the desired vibration pickup element, which provides an electrical signal containing the entire vibration frequency spectrum of the engine at the selected locale of the pickup, the signal is integrated to put it in a form corresponding to the actual vibrating movement of the engine and is applied to the recording head 8 of the recording apparatus after its recording level has been adjusted through amplifier 6. Since the actual engine speed corresponds to the reference speed, the output of variable speed motor 20 corresponds to the reference speed, i.e. the speed of the constant speed motor 25, the reduction gearing between these motors being such as to make the two inputs to differential 23 rotate at the same speed but in opposite directions. Thus, the two inputs to differential 23 cancel and there is no movement of the shaft 24 or wheel 10.

This means that the detected vibration signal is recorded on the tape 7 with neither stretching nor compression of the wave length of the signal on the tape as related to the wave length seen by the playback head. It will be understood that any previous information recorded on the tape 7 will be erased by erase head 8' before the new data is recorded. Since the recorded vibration data has been neither stretched nor compressed at this standard operating speed of the engine, the reproduce head 9 will reproduce this data with unchanged frequency and amplitude (except for the derivative effects of the reproduce head which are compensated by the integrator and amplifier 30) and apply it to the amplifier 30 where it is amplified or attenuated depending upon the setting of level adjust knob 33 to appear at the output 35. Thus, the entire frequency spectrum detected by the selected engine pickup is applied unchanged or untransformed to the filter 36 which, as stated, passes that desired frequency which has been manually set to correspond to the frequency of the vibration source or engine component it is desired to examine by either push button 37 or knob 38. The magnitude of the vibration produced by the component under examination is displayed on the vibration indicator 39 which indicates to the operator the vibratory condition of that component. In describing the operation of the apparatus, a 1:1 ratio between actual engine speed and the reference speed has been given as an example. However, it should be appreciated that this example is for explanation purposes only and that in actual practice the record-erase head always moves fairly rapidly with respect to the tape, even at the lowest engine speeds contemplated.

Now, suppose that it is desired to check engine operation at a speed other, say higher, than the reference speed. Suppose also that filter 36 has been adjusted to a specific frequency corresponding to the tachometer ratio of a particular engine part. As the engine speed changes, the entire frequency spectrum detected by the selected pickup will be shifted by the recording apparatus in inverse proportion to the change in engine speed. Thus, the recording apparatus will transform the frequency spectrum downward in exact opposition to engine speed increase so that no change in the calibration of the filter will have to be made. Again, the pickup signal is integrated and applied to the amplifier 6 where its recording level is adjusted and is then applied to the record head 8. However, since the engine speed has increased, the speed of variable speed motor 20 will have increased proportionally and the output 19 thereof to the differential 23 will be correspondingly increased in speed. On the other hand, motor 25 continues to drive at the constant speed. The resultant difference in speeds will effect a rotation of the wheel 10 in accordance with this difference, thereby moving the record head 8 (and the erase head 8') in such a direction as to increase the relative speed between the record head 8 and tape 7 (as indicated by the arrows). In this manner, since the read-out frequency will be proportional not only to the write frequency but also the speed of the tape, the read-out frequency will be reduced by an amount proportional to the difference in the actual speed of the engine and the reference speed. In this manner, the read-out frequency from the head 9 will be transformed, normalized, or, in the example under consideration, reduced to the frequency corresponding to the reference speed of the engine. In other words, as far as the filter is concerned, the engine has not changed speed. Since the filter "sees" no change in engine speed, its filter characteristics do not have to be changed in accordance with changes in engine speed and all that is necessary on the part of the operator is merely to select the predetermined component frequency corresponding to the vibration characteristic of that component and read the magnitude of the vibration, no further calculations having to be made to compensate for engine speed. The operation is continuous and the frequency conversion automatically carried out over the entire or desired range of engine speeds.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. Apparatus for analyzing the operation of a cyclically operating mechanism through its vibration characteristics wherein the vibrations of the components of said mechanism vary in predetermined fixed ratios with respect to the speed of operation of said mechanism over the speed range thereof, said apparatus comprising vibration responsive means for providing signals having frequencies and amplitudes corresponding to the actual frequencies of amplitudes of vibration of said components at the actual operating speed of the mechanism over said speed range, means responsive to said signals for converting the frequencies thereof to signals having frequencies corresponding to the frequencies of said vibrations at a reference speed, a bandpass filter, means for tuning said filter to a frequency corresponding to selected ones of said predetermined ratios, means for supplying said converted signals to said filter, and means for providing a measure of the amplitude of the converted signal passed by said filter so tuned.

2. In an apparatus for analyzing the vibration characteristics of the component parts of a cyclically operating mechanism, the vibration frequencies of said parts varying in accordance with predetermined fixed ratios with respect to the operating speed of said mechanism, said apparatus having pickup means for detecting and providing a signal dependent upon the resultant of the vibration frequencies of said parts of said mechanism adjacent said pickup means, the combination comprising a recording medium and a recording means responsive to said signal for recording said signal on said medium, drive means for producing relative movement between said recording medium and recording means and substantially parallel to the surface of said recording medium dependent upon the algebraic difference between the actual speed of said mechanism and a reference operating speed thereof, a reproducing means adjacent said medium for reproducing the signal recorded thereon and for supplying an output, said drive means including means for producing relative movement between said recording medium and said reproducing means and substantially parallel to the surface of said recording medium dependent on said reference operating speed whereby the frequency of said recorded signal is transformed in said output to a frequency corresponding to the resultant frequencies of vibration of said parts at said reference operating speed for all operating speeds of said mechanism.

3. Apparatus for continuously analyzing the vibration characteristics of the components of a turbine engine over its speed range through an examination of the vibration frequency spectrum of said engine over said speed range and wherein the vibrations of said components vary in predetermined fixed ratios over said speed range, said apparatus comprising vibration pickup means on said engine for continuously producing an electrical signal proportional to the vibration frequency spectrum of said engine components over said speed range, a recording medium and a recording means adapted to be supported for relative movement parallel to the surface of said recording medium, first drive means for driving said recording medium at a reference speed, second drive means responsive to said first drive means and the actual speed of said engine and coupled with said recording means for driving said recording means in the same or opposite directions relative to said recording medium in accordance with the algebraic difference between the actual speed of said engine and said reference speed, means responsive to said signal and coupled with said recording means for recording said vibration signal on said medium, a reproducing means fixedly supported adjacent said recording medium for producing an output signal of a frequency corresponding to the vibration frequencies recorded on said medium whereby the reproduced frequency spectrum will be normalized to a substantially fixed frequency spectrum for all engine speeds over said range, filter means tunable to the frequency components corresponding to the predetermined vibration characteristics of said engine components at said reference speed, means for selectively tuning said filter to desired ones of said frequency components, and means for impressing said output signal on the input of said filter means whereby to determine the amplitude of said tuned frequency component in said detected frequency spectrum over the said speed range of said engine.

4. In an apparatus for analyzing the vibration characteristics of a cyclically operated mechanism having pickup means for providing a signal dependent upon the resultant vibration frequency of said mechanism, the combination comprising a recording medium, a record means, and a reproduce means, means for producing relative movement between said record means and said medium substantially parallel to the surface of said medium and in the same or opposite directions in accordance with the algebraic difference between the actual speed of said mechanism and a reference speed thereof, means responsive in part to said last mentioned means for producing relative movement substantially parallel to the surface of said medium between said reproduce means and said medium in accordance with said reference speed, means for supplying said pickup signal to said record means whereby the frequency of the signal recorded on said medium is dependent upon the frequency of vibration of said mechanism at said actual speed and said reference speed thereof, and means coupled with said reproduce means for supplying an output signal dependent upon the frequency of said mechanism vibration at said reference speed whereby the vibration frequency to be analyzed is normalized to a reference frequency range over the speed range of said mechanism.

5. The apparatus set forth in claim 1 wherein said converting means comprises a recording medium, a record means responsive to said signals and a reproduce means for producing an output signal, first means for driving said recording medium in a predetermined direction and at said reference speed, means for supporting said record means for movement substantially parallel to the surface of said recording medium and in the same or opposite directions relative to the direction of movement of said recording medium, second drive means responsive to said first drive means and the actual speed of said mechanism for driving said record means in accordance with the algebraic difference between the speeds thereof, said reproducing means being fixedly mounted relative to said recording medium whereby the frequency of the recorded signals is dependent upon the operating speed of the mechanism and the frequency of the output of said reproducing means is dependent upon said reference speed.

6. Apparatus as set forth in claim 3 further comprising an indicator coupled with said filter for providing a measure of the amplitude of the vibration frequencies passed thereby.

7. Apparatus for analyzing the operation of a cyclically operating mechanism through its vibration characteristics wherein the vibrations of the components of said mechanism vary in predetermined fixed ratios with respect to the speed of operation of said mechanism over the speed range thereof, said apparatus comprising vibration responsive means for providing signals having frequencies and amplitudes corresponding to the actual frequency and amplitude vibration of said components at the actual operating speed of the mechanism over said speed range, means responsive to said signals for converting the frequencies thereof to signals having frequencies corresponding to the frequencies of said vibrations at a reference speed, a bandpass filter responsive to said converted signals and adapted to be selectively tuned to pass frequencies within a band of frequencies corresponding to the maximum and minimum of said predetermined fixed ratios and for supplying outputs in accordance therewith, means for selectively tuning said filter in accordance with said fixed ratios, and means responsive to the output of said filter for providing a measure of the amplitude of the converted signals passed by said filter.

8. Apparatus for analyzing the vibration characteristics of selected components of a rotary engine over the speed range of said engine, the vibration frequency of each of said components bearing a predetermined ratio to the frequency of rotation of said engine, said ratio remaining constant over said speed range, the combination comprising means for detecting the over-all frequencies and amplitudes of the actual vibrations of said engine over said speed range, means responsive to said detecting means for transforming said detected frequencies to frequencies corresponding to the frequencies of vibration at a reference engine speed and for supplying an output in accordance therewith, means connected to receive said output for selectively filtering said transformed frequencies in accordance with said predetermined component ratios, and means responsive to said filter means for indicating the amplitude of the selectively filtered frequency whereby to determine the vibration characteristics of the selected component over the speed range of the engine.

References Cited in the file of this patent

UNITED STATES PATENTS

| | | |
|---|---|---|
| 2,377,349 | MacKenzie | June 5, 1945 |
| 2,651,195 | Engstrom | Sept. 8, 1953 |
| 2,711,647 | Ongaro et al. | June 28, 1955 |